(12) United States Patent
Merlin et al.

(10) Patent No.: US 9,949,293 B2
(45) Date of Patent: Apr. 17, 2018

(54) CONTENTION RESOLUTION TECHNIQUES IN FREQUENCY AND SPATIAL DOMAINS

(71) Applicant: QUALCOMM Incorporated, San Diego, CA (US)

(72) Inventors: Simone Merlin, San Diego, CA (US); George Cherian, San Diego, CA (US); Gwendolyn Denise Barriac, Encinitas, CA (US); Gang Ding, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 101 days.

(21) Appl. No.: 14/922,762

(22) Filed: Oct. 26, 2015

(65) Prior Publication Data

US 2016/0119953 A1     Apr. 28, 2016

Related U.S. Application Data

(60) Provisional application No. 62/069,762, filed on Oct. 28, 2014.

(51) Int. Cl.
*H04W 74/08* (2009.01)
*H04W 84/12* (2009.01)

(52) U.S. Cl.
CPC ........ *H04W 74/0816* (2013.01); *H04W 84/12* (2013.01)

(58) Field of Classification Search
CPC ........................... H04W 74/0816; H04W 84/12
See application file for complete search history.

(56) References Cited

U.S. PATENT DOCUMENTS

| | | | | |
|---|---|---|---|---|
| 2007/0259675 A1* | 11/2007 | Worrall | ................ | H04W 68/00 455/458 |
| 2012/0063433 A1* | 3/2012 | Wentink | ................ | H04W 76/02 370/338 |
| 2013/0343241 A1* | 12/2013 | Niu | ........................ | H04B 15/00 370/280 |
| 2014/0328195 A1* | 11/2014 | Sampath | ............. | H04W 72/082 370/252 |
| 2015/0382283 A1* | 12/2015 | Wang | ................ | H04W 52/0216 370/328 |
| 2016/0105836 A1* | 4/2016 | Seok | ..................... | H04W 36/32 370/331 |

* cited by examiner

*Primary Examiner* — Duc C Ho
(74) *Attorney, Agent, or Firm* — Holland & Hart LLP

(57) ABSTRACT

Methods, systems, apparatuses, and devices are described for contention resolution techniques for medium access using a spatial dimension, a frequency dimension, or a combination of the both. A wireless station may determine that an access timer associated with backoff operations has expired. The wireless station may identify a domain index associated with the frequency domain, the spatial domain, or a combination. The wireless station may access the wireless medium according to the identified domain index. The wireless station may, prior to sending other transmissions, transmit a trigger frame including information associated with the resources of the wireless medium that are reserved for communications. Other wireless stations may share the medium and use the free resources.

18 Claims, 12 Drawing Sheets

| 9 | | STA2 PAD | STA2 PPDU |
|---|---|---|---|
| 8 | 3 | STA1 PAD | STA1 PPDU |
| 7 | 4 | 1 | Unused |
| 6 | 5 | 2 | Unused |

CONTENTION RESOLUTION TECHNIQUES IN FREQUENCY AND SPATIAL DOMAINS

CROSS REFERENCES

The present application for patent claims priority to U.S. Provisional Patent Application No. 62/069,762 by Merlin et al., entitled "Contention Resolution Techniques in Frequency and Spatial Domains," filed Oct. 28, 2014, assigned to the assignee hereof, and expressly incorporated by reference herein.

BACKGROUND

The present disclosure relates to wireless communication systems, and more particularly to contention resolutions techniques in a wireless network that utilize frequency and/or spatial domains.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a Wireless Local Area Network (WLAN), such as a Wi-Fi network (IEEE 802.11) may include an access point (AP) that may communicate with one or more stations (STAs) or mobile devices. The AP may be coupled to a network, such as the Internet, and enable a mobile device to communicate via the network (and/or communicate with other devices coupled to the AP).

In some examples, a mobile device may attempt to access a medium or channel of a network by monitoring the channel status. If the channel is unavailable, the mobile device may defer its access attempt to the channel for a period of time (referred to as backoff operations) and, when the time expires, attempt to access the channel by exchanging request-to-send/clear-to-send (RTS/CTS) messages with an AP. A collision may occur when more than one mobile device ends its waiting period at the same time and attempts to seize the same channel. This collision may result in a loss of the colliding transmissions.

Additionally, when a mobile device successfully accesses the medium at the end of its backoff operation, it may not necessarily utilize the full resources of the medium. For example, a mobile device with a small amount of data to communicate may use one carrier of the channel, may only use the channel for a portion of the frame, etc. According to current implementations, as other mobile devices will not attempt to access the medium until a subsequently free frame, the remaining resources of the medium are underutilized.

SUMMARY

The described features generally relate to various improved systems, methods, and/or apparatuses for wireless communications. Such systems, methods, and/or apparatuses may provide for contention resolution techniques to avoid collisions upon expiry of backoff operations. The techniques may include utilization of a frequency domain, a spatial domain, or a combination of both. When the backoff operation ends, the mobile device may identify a domain index for the medium access. The mobile device may identify the domain index independently or may receive an indication from an access point (AP) of the domain index. The domain index may include information associated with a frequency domain, with a spatial domain, or a combination frequency/spatial domain. When the backoff operation ends (e.g., a timer expires), the mobile device may access the medium by sending signals to the AP according to the domain index. For example, the mobile device may transmit a signal according to a frequency domain (e.g., on one or more carriers and/or bandwidths in the frequency domain), according to a spatial domain (e.g., via one or more ports), or a combination of either.

In some aspects, the mobile device may send a trigger frame when it successfully accesses a medium upon expiry of a timer associated with backoff operations. The trigger frame may be transmitted to other mobile devices and include an indication of the resources of the medium the mobile device will be using. For example, the trigger frame may include an indication that the mobile device will only use one, two, or some other number of carriers of the medium. Accordingly, another mobile device may use the free resources of the medium in conjunction with the first mobile device. The first mobile device may transmit the trigger frame prior to transmitting its own communications. In this example, the trigger frame may be transmitted by a mobile device using multi-domain contention resolution techniques and/or by a mobile device using traditional medium access contention resolution techniques.

In a first set of illustrative examples, a method for wireless communication is provided. The method may include: identifying an expiration of a timer associated with a medium access backoff operation; identifying a domain index associated with the medium access, the domain index comprising an indication of at least one of a frequency domain, a spatial domain, or combinations thereof; and transmitting one or more signals to access the medium upon the expiration of the timer and according to the domain index.

In some aspects, the method may include performing, prior to accessing the medium, a timing synchronization alignment with an access point associated with the medium. The method may include performing, prior to accessing the medium, a power control procedure with an access point associated with the medium. The method may include selecting the domain index from a set of available domain indexes. The method may include receiving a signal from an access point associated with the medium, the signal including an indication of the domain index.

In some aspects, the method may include: identifying a plurality of domain indexes associated with the medium access; identifying an expiration of a timer associated with at least one of the plurality of domain indexes for the medium access; and transmitting the one or more signals to access the medium upon the expiration of the timer associated with a first domain index of the plurality of domain indexes and according to the first domain index. The method may include: determining that the medium access according to the first domain index is unsuccessful; incrementing the timer associated with the first domain index; and transmitting the one or more signals to access the medium upon the expiration of a timer associated with a second domain index of the plurality of domain indexes and according to the second domain index.

In some aspects, the method may include transmitting, upon accessing the medium, a trigger frame including information indicative of resources of the medium to be used for transmissions. The method may include sharing at least a portion of the resources of the medium based on transmission of the trigger frame. The at least portion of the resources of the medium may be shared with a wireless station. The domain index may include information indicative of a primary channel of a basic subscriber set.

In some aspects, the frequency domain may include information associated with one or more subchannel parameters. The method may include: determining that the medium access according to the domain index associated with the frequency domain is unsuccessful; adjusting one or more subchannel parameters; and transmitting the one or more signals to access the medium upon the expiration of the timer and according to the frequency domain comprising the adjusted one or more subchannel parameters. Adjusting the one or more subchannel parameters may include reducing a bandwidth parameter for the medium access.

In a second set of illustrative examples, an apparatus for wireless communication is provided. The apparatus may include: a processor; memory in electronic communication with the processor; and instructions being stored in the memory. The instructions may be executable by the processor to: identify an expiration of a timer associated with a medium access backoff operation; identify a domain index associated with the medium access, the domain index comprising an indication of at least one of a frequency domain, a spatial domain, or combinations thereof; and transmit one or more signals to access the medium upon the expiration of the timer and according to the domain index.

In some aspects, the apparatus may include instructions executable by the processor to perform, prior to accessing the medium, a timing synchronization alignment with an access point associated with the medium. The apparatus may include instructions executable by the processor to perform, prior to accessing the medium, a power control procedure with an access point associated with the medium. The apparatus may include instructions executable by the processor to select the domain index from a set of available domain indexes.

In some aspects, the apparatus may include instructions executable by the processor to receive a signal from an AP associated with the medium, the signal comprising an indication of the domain index. The apparatus may include instructions executable by the processor to: identify a plurality of domain indexes associated with the medium access; identify an expiration of a timer associated with at least one of the plurality of domain indexes for the medium access; and transmit the one or more signals to access the medium upon the expiration of the timer associated with a first domain index of the plurality of domain indexes and according to the first domain index. The apparatus may include instructions executable by the processor to: determine that the medium access according to the first domain index is unsuccessful; increment the timer associated with the first domain index; and transmit the one or more signals to access the medium upon the expiration of a timer associated with a second domain index of the plurality of domain indexes and according to the second domain index.

In some aspects, the apparatus may include instructions executable by the processor to transmit, upon accessing the medium, a trigger frame including information indicative of resources of the medium to be used for transmissions. The apparatus may include instructions executable by the processor to share at least a portion of the resources of the medium based on transmission of the trigger frame. The at least portion of the resources of the medium may be shared with a wireless station.

In some aspects, the domain index may include information indicative of a primary channel of a basic subscriber set. The frequency domain may include information associated with one or more subchannel parameters. The apparatus may include instructions executable by the processor to: determine that the medium access according to the domain index associated with the frequency domain is unsuccessful; adjust the one or more subchannel parameters; and transmit the one or more signals to access the medium upon the expiration of the timer and according to the frequency domain including the adjusted one or more subchannel parameters. Adjusting the one or more subchannel parameters may include reducing a bandwidth parameter for the medium access.

In a third set of illustrative examples, a method for wireless communication is provided. The method may include: identifying an expiration of a timer associated with a medium access backoff operation; accessing the medium upon the expiration of the timer; and transmitting, upon accessing the medium, a trigger frame comprising information indicative of resources of the medium to be used for transmissions.

In some aspects, the method may include sharing at least a portion of the resources of the medium based on transmission of the trigger frame. The resources may include a frequency resource, a channel resource, a bandwidth resource, a time resource, or combinations thereof. The trigger frame may be transmitted prior to other transmissions.

In a fourth set of illustrative examples, an apparatus for wireless communication is provided. The apparatus may include: a processor; memory in electronic communication with the processor; and instructions being stored in the memory. The instructions may be executable by the processor to: identify an expiration of a timer associated with a medium access backoff operation; access the medium upon the expiration of the timer; and transmit, upon accessing the medium, a trigger frame comprising information indicative of resources of the medium to be used for transmissions.

In some aspects, the apparatus may include instructions executable by the processor to share at least a portion of the resource of the medium based on transmission of the trigger frame. The resources may include a frequency resource, a channel resource, a bandwidth resource, a time resource, or combinations thereof. The trigger frame may be transmitted prior to other transmissions.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims.

Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
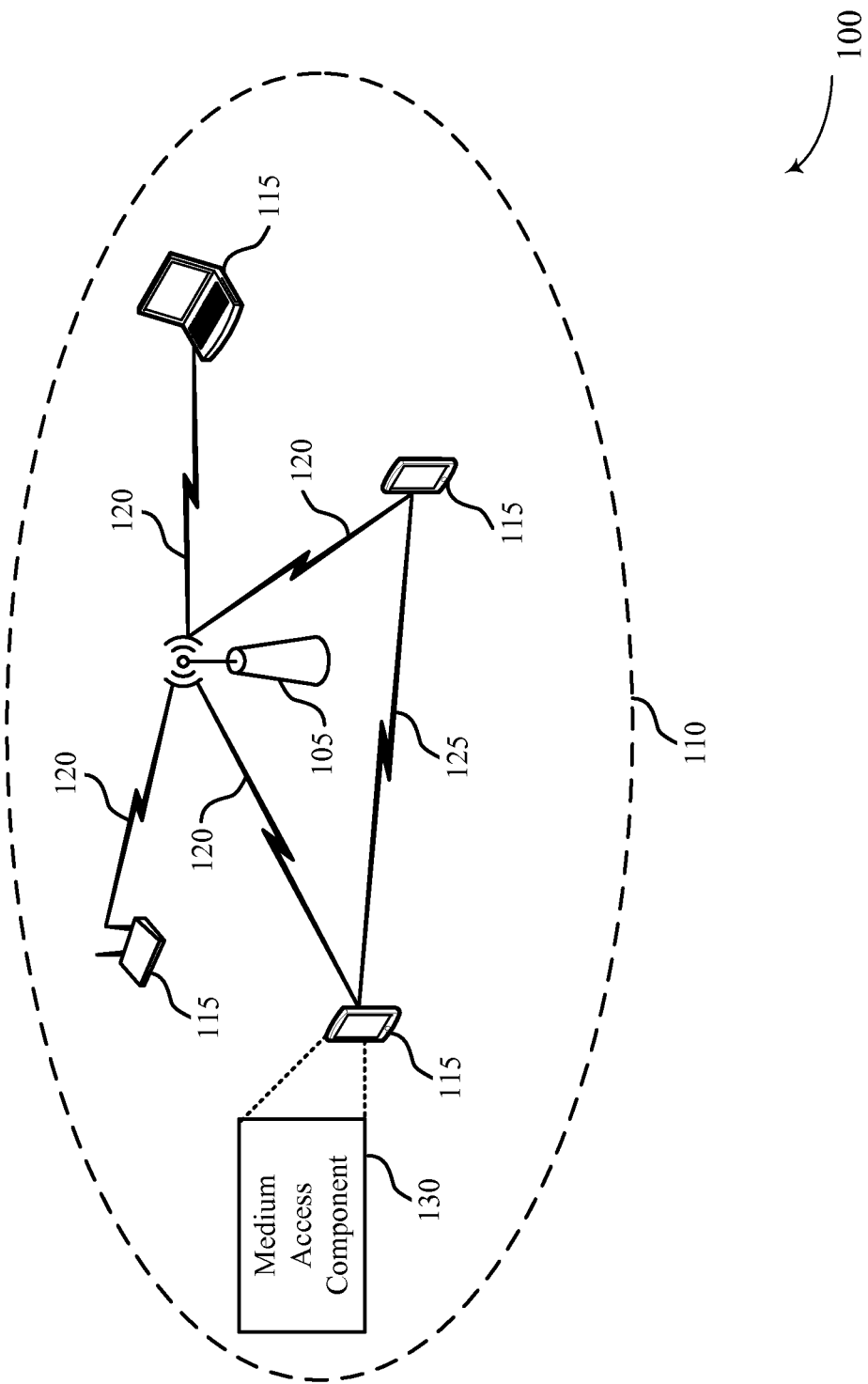
FIG. 1 shows a block diagram of a wireless communication system, in accordance with various aspects of the present disclosure.

When a mobile device has communications to exchange with an access point (AP), it may sense the medium to determine if it's busy and, if not, attempt to access the medium according to a timing of the medium, e.g., interframe space, short interframe space, slot time, etc. Current contention resolution techniques, e.g., distributed coordination function (DCF), attempt to avoid collisions that would occur when two or more mobile devices try to access a wireless medium at the same time by employing a random access timer on the mobile device that forces the mobile device to defer its access to the wireless medium for an extra period. The length of the extra period may be determined as a function of a random number and a slot time associated with the wireless channel, for example. Thus, current contention resolution techniques may rely on a time dimension in order to prevent collisions. These techniques, however, may not always succeed in large networks when more than one mobile device completes its backoff operations at the same time and tries to access the medium. As the number of mobile devices in use increases, so too does the likelihood that more than one mobile device end their backoff operations at the same time and try to access the medium. Moreover, when a mobile device successfully accesses the medium, there may be unused resources of the medium that could otherwise be used by other mobile devices with communications to exchange.

Aspects of the present disclosure relate to contention resolution techniques that utilize a frequency domain, a spatial domain, or a combination of the two to avoid collisions by mobile devices attempting to access the medium at the same time. The mobile device may identify or determine a domain index for accessing the wireless medium. Generally, the domain index may include information indicative of orthogonal resources (e.g., in frequency, in time, etc.) where concurrent transmissions in different domains may not interfere with each other. The domain index may include an indication of a frequency domain and/or a spatial domain the mobile device may use to access the medium. The domain index may provide an additional dimension (spatial, frequency, etc.) to contention resolution techniques, thereby decreasing the probability that a collision will occur. As one non-limiting example, a mobile device sending uplink (UL) transmissions in an orthogonal frequency division multiple access (OFDMA) network may, for a frequency domain, transmit on a particular subband of the medium. As another non-limiting example, a mobile device communicating via UL multiuser multiple input/multiple output (MU MIMO) techniques may, for a spatial domain, transmit on a particular stream (e.g., port). When the mobile device completes its backoff operation, it may transmit one or more signals to an AP to access the wireless medium according to its domain index. In either of the above examples, multiple mobile devices may end their backoff operations at the same time and may send transmissions to an AP. However, because the transmissions may have been transmitted in accordance with one or more additional dimensions (frequency, spatial, etc.), the transmissions may avoid collision. Therefore, in some aspects, the described contention resolution techniques may reduce collision probability by allowing transmission on orthogonal resources for mobile devices performing random access.

According to further aspects of the present disclosure, a mobile device that successfully captures the wireless medium may share aspects of the wireless medium. The mobile device may capture the medium using the described multi-dimensional techniques or using the traditional enhanced distributed channel access (EDCA) techniques. The mobile device may not need all of the resources of the medium, e.g., the full bandwidth of the medium, and may transmit a trigger frame before initializing its communications. The trigger frame may include an indication of which resources of the medium are needed, e.g., reserved resources. Other mobile devices may transmit on the remaining resources after the trigger frame, e.g., after a short interframe space (SIFS) after the trigger frame is transmitted.

According to further aspects of the present disclosure, an access procedure is described (e.g., a timer countdown) that may be based on a state of a first set of domain indexes, then a transmission is performed on a second set of domain indexes. In some aspects, the second set of domain indexes may be the same as the first set of domain indexes, or a subset of the first domain indexes, or a superset of the first domain indexes, or a disjointed set of the domain indexes, etc. In some aspects, multiple mobile devices may use the same second set of domain indexes (e.g., current EDCA techniques). In other aspects, the multiple mobile devices may use a different second set of domain indexes for its transmissions.

In one example, the first set of domain indexes may comprise a 20 MHz channel of a basis subscriber set (BSS), irrespective of the spatial dimension, the state may comprise the presence or absence of energy in the 20 MHz channel (e.g., CCA procedure, irrespective of the spatial dimension) and the access procedure may comprise a DCF, an EDCA, or other random contention resolution access. Accordingly, a first mobile device may use a second set of domain indexes associated with transmissions on spatial stream 1 with a 20 MHz bandwidth where a second mobile device may use a second set of domain indexes associated with transmissions on spatial stream 2 also having a 20 MHz bandwidth. Accordingly, mobile devices 1 and 2 may avoid collisions due to their transmissions being orthogonal to each other.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring first to FIG. 1, a block diagram illustrates an example of a WLAN network 100. The WLAN network 100 may include an access point (AP) 105 and one or more wireless devices or stations (STAs) 115, such as mobile stations, personal digital assistants (PDAs), other handheld devices, netbooks, notebook computers, tablet computers, laptops, display devices (e.g., TVs, computer monitors, etc.), printers, etc. While only one AP 105 is illustrated, the WLAN network 100 may have multiple APs 105. Each of the wireless stations 115, which may also be referred to as mobile stations (MSs), mobile devices, access terminals (ATs), user equipment (UE), subscriber stations (SSs), or subscriber units, may associate and communicate with an AP 105 via a communication link 120. Each AP 105 has a geographic coverage area 110 such that wireless stations 115 within that area can typically communicate with the AP 105. The wireless stations 115 may be dispersed throughout the geographic coverage area 110. Each wireless station 115 may be stationary or mobile.

Although not shown in FIG. 1, a wireless station 115 can be covered by more than one AP 105 and can therefore associate with one or more APs 105 at different times. A single AP 105 and an associated set of stations may be referred to as a basic service set (BSS). An extended service set (ESS) is a set of connected BSSs. A distribution system (DS) (not shown) is used to connect APs 105 in an extended service set. A geographic coverage area 110 for an AP 105 may be divided into sectors making up only a portion of the coverage area (not shown). The WLAN network 100 may include APs 105 of different types (e.g., metropolitan area, home network, etc.), with varying sizes of coverage areas and overlapping coverage areas for different technologies. Although not shown, other wireless devices can communicate with the AP 105.

While the wireless stations 115 may communicate with each other through the AP 105 using communication links 120, each wireless station 115 may also communicate directly with one or more other wireless stations 115 via a direct wireless link 125. Two or more wireless stations 115 may communicate via a direct wireless link 125 when both wireless stations 115 are in the AP geographic coverage area 110 or when one or neither wireless station 115 is within the AP geographic coverage area 110 (not shown). Examples of direct wireless links 125 may include Wi-Fi Direct connections, connections established by using a Wi-Fi Tunneled Direct Link Setup (TDLS) link, and other P2P group connections. The wireless stations 115 in these examples may communicate according to the WLAN radio and baseband protocol including physical and MAC layers. In other implementations, other peer-to-peer connections and/or ad hoc networks may be implemented within WLAN network 100.

One or more wireless stations 115 may include a medium access component 130 that manages aspects of accessing a wireless medium (e.g., communication link 120) for wireless communications with the AP 105. The wireless stations 115 may support multi-dimensional contention resolution techniques. The medium access component 130 may identify or determine a domain index associated with accessing the medium that includes a spatial domain, a frequency domain, or a combination spatial/frequency domain. For example, the domain index may indicate one or more subbands of the medium and/or a spatial stream for accessing the medium. The wireless station 115 may access the medium based on the domain index to avoid collisions with other wireless stations 115 attempting to access the medium. For example, a first wireless station 115 may access the medium using a first subband, or set of subbands, while a second wireless station 115 may access the medium using a second subband, or set of subbands. Upon accessing the medium, the wireless station 115 may, via the medium access component 130, transmit a trigger frame indicating which resources of the medium are reserved for communications. Another wireless station 115 may attempt to access the unused resources on a random basis, for example. Accordingly, the full resources of the medium may be shared between two or more wireless stations 115 based on the trigger frame.

Figure 2:
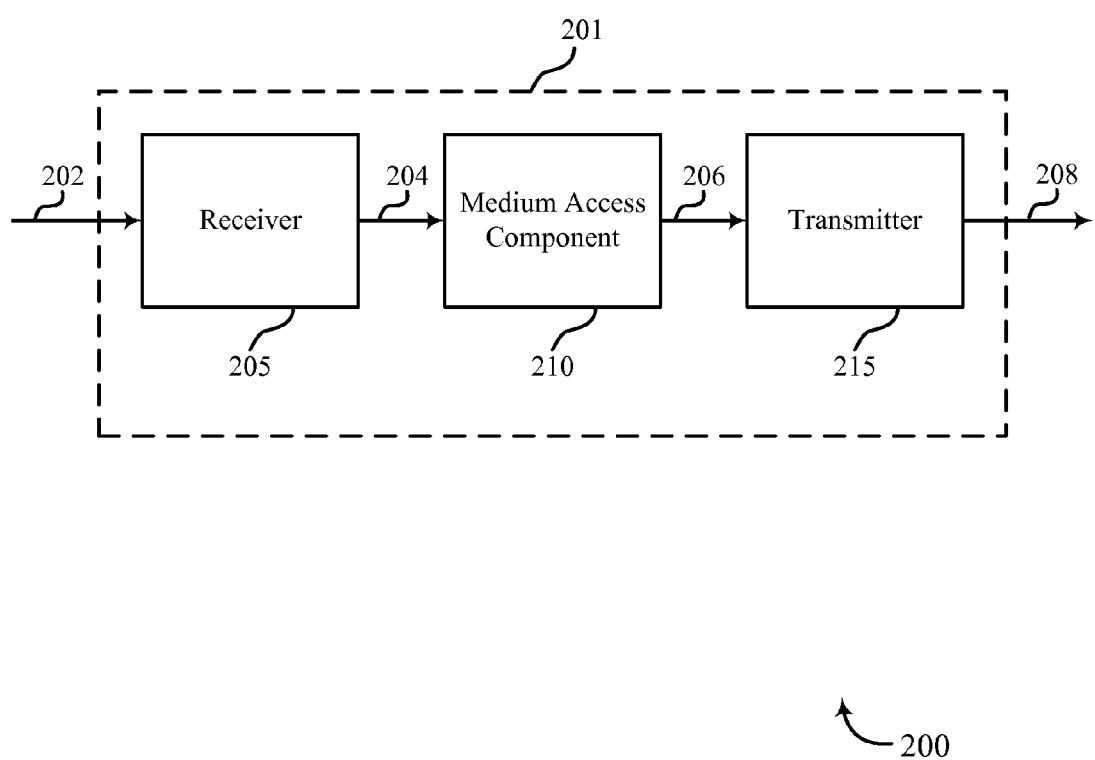
FIG. 2 shows a block diagram of a device configured for use in wireless communication, in accordance with various aspects of the present disclosure.

FIG. 2 shows a block diagram 200 of an apparatus 201 for use in a station for wireless communication, in accordance with various aspects of the present disclosure. In some examples, the apparatus 201 may be an example of aspects of one or more of the wireless stations 115 described with reference to FIG. 1. The apparatus 201 may also be or include a processor (not shown). The apparatus 201 may include a receiver 205, a medium access component 210, and/or a transmitter 215. Each of these components may be in communication with each other via signals 204 and/or 206.

The apparatus 201, through the receiver 205, the medium access component 210, and/or the transmitter 215, may be configured to perform functions described herein. For example, the apparatus 201 may be configured to manage aspects of medium access of the apparatus 201.

The components of the apparatus 201 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

The receiver 205 may receive information such as packets, user data, and/or control information associated with various information channels (e.g., control channels, data channels, etc.). The receiver 205 may be configured to receive, via link 202, one or more signals, messages, and the like from an access point for multi-dimensional medium access. The receiver 205 may be configured to receive signals, messages, and the like from the AP associated with accessing the medium of the access point. Information may be passed on to the medium access component 210, and to other components of the apparatus 201.

The medium access component 210 may manage one or more aspects of medium access for the apparatus 201. The medium access component 210 may include a timer associated with backoff operations, e.g., the timer may be started when the apparatus 201 determines the medium is busy. When the timer expires, the medium access component 210 may identify or determine a domain index for accessing the medium. The domain index may include information associated with a frequency domain, a spatial domain, or a frequency and spatial domain. The medium access component 210 may, when the backoff operation timer expires, transmit signal(s) via the transmitter 215 to access the medium. The transmitted signals may be determined according to the domain index, e.g., transmitted via a particular stream, transmitted via subband(s) of the medium, etc. Accordingly, the apparatus 201 may avoid collisions with a second wireless station accessing the medium according to its domain index. The medium access component 210 may identify the domain index (e.g., randomly or based on a unique feature of the apparatus 201) or may receive a signal from an AP indicating an assigned domain index.

In some aspects, the medium access component 210 may also manage one or more aspects of trigger frame transmission for the apparatus 201. The medium access component 210 may determine that the apparatus 201 has successfully accessed the medium according to the described multi-dimensional contention resolution techniques or through traditional EDCA techniques. The medium access component 210 may determine that only a portion of the resources of the medium are needed, e.g., only 40 MHz of bandwidth of an 80 MHz bandwidth medium are required. Accordingly, the medium access component 210 may transmit, via the transmitter 215, a trigger frame indicating the resources reserved for the apparatus 201. Other wireless stations may receive the trigger frame and communicate via the free resources of the medium. The other wireless stations may access the free resources on a random basis, on a predefined order, etc. The medium access component 210 may transmit the trigger frame prior to commencing its communications, e.g., before exchanging data with the AP.

The transmitter 215 may transmit the one or more signals received from other components of the apparatus 201. The transmitter 215 may transmit via link 208 various signals, messages, etc., associated with medium access and/or trigger frame transmission. In some examples, the transmitter 215 may be collocated with the receiver 205 in a transceiver component. The transmitter 215 may include a single antenna, or it may include a plurality of antennas.

Figure 3:
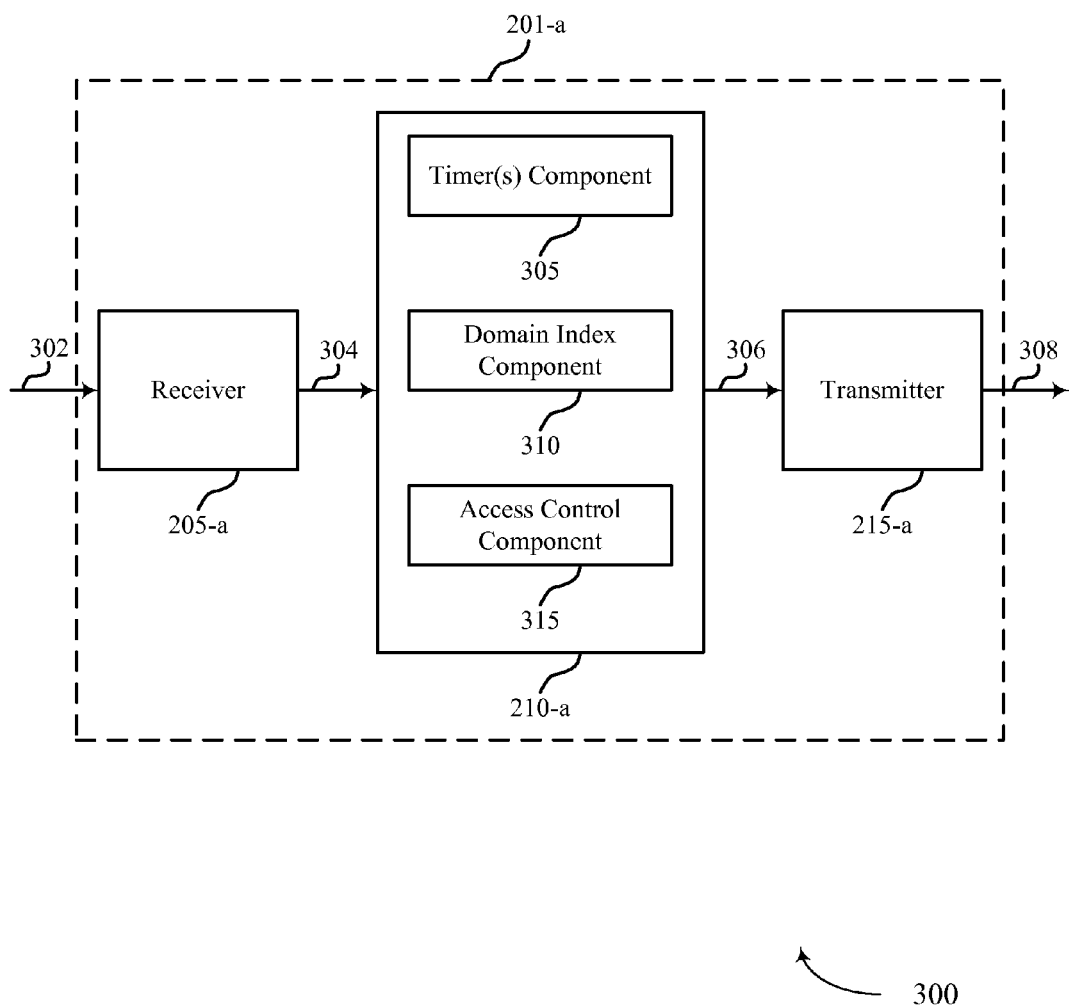
FIG. 3 shows a block diagram of a device configured for use in wireless communication, in accordance with various aspects of the present disclosure.

FIG. 3 shows a block diagram 300 of an apparatus 201-a that is used in a wireless station for wireless communication, in accordance with various examples. The apparatus 201-a may be an example of one or more aspects of a wireless station 115 described with reference to FIG. 1. It may also be an example of an apparatus 201 described with reference to FIG. 2. The apparatus 201-a may include a receiver 205-a, a medium access component 210-a, and/or a transmitter 215-a, which may be examples of the corresponding components of apparatus 201. The apparatus 201-a may also include a processor (not shown). Each of these components may be in communication with each other via links 304 and/or 306. The medium access component 210-a may include a timer component 305, a domain index component 310, and an access control component 315. The receiver 205-a and the transmitter 215-a may perform the functions of the receiver 205 and the transmitter 215 of FIG. 2, respectively.

The timer component 305 may monitor, manage, or otherwise perform functions related to timing operations associated with backoff operations and/or trigger frame transmission. The timer component 305 may include one or more timers that may be associated with one or more corresponding backoff operations for multi-dimensional medium access and contention resolution techniques. The timer component 305 may, via the receiver 205-a and/or transmitter 215-a and links 302 and 308, respectively, manage aspects of timing synchronization with an AP to align timing signals. The timing synchronization may provide for alignment of one or more access timers with frame timing for the medium. In some example, the timer component 305 may maintain timing alignment with the AP via subframes received from the AP during extended periods of inactivity.

In some aspects, the timer component 305 may manage aspects of access timers for multiple domain indexes. The apparatus 201-a may identify multiple domain indexes for medium access and the timer component 305 may include an access timer for each identified domain index. Each access timer may be incremented when an attempt to access the medium via the associated domain index is unsuccessful. An access timer for a second domain index may be used to initiate medium access upon its expiration and according to the second medium access.

The domain index component 310 may monitor, manage, or otherwise perform various functions related to multi-dimensional contention resolution techniques for the apparatus 201-a. In some aspects, the domain index component 310 may autonomously select one or more domain indexes on a random basis or based on a unique feature of the apparatus 201-a, e.g., a unique identifier. In other aspects, the domain index component 310 may receive a signal from an access point including information associated with an assigned domain index(es) for the apparatus 201-a. The domain index may include a frequency domain and/or a spatial domain. The frequency domain may include information indicative of one or more channels or subchannels of the wireless medium. As each channel or subchannel may support an associated bandwidth, the frequency domain may also include information indicative of a bandwidth for the medium. The spatial domain may include information indicative of one or more spatial streams for communicating via the wireless medium. For example, the apparatus 201-a may support UL MU MIMO techniques where the transmitter 215-a includes a plurality of transmit chains and associated antennas. Each transmit chain and associated antenna (or port) may support communication via the wireless medium and include an indication in the communications of which port (or spatial stream) the communication was transmitted from.

In some aspects, the domain index component 310 may include information indicative of a plurality of domain indexes, or a set of domain indexes for the apparatus 201-a. The medium access component 210-a may support contention resolution techniques using more than one domain index. For example, a medium access attempt via a first domain index may include a frequency domain that is unsuccessful. The medium access component 210-a may attempt a second medium access attempt based on a second domain index that includes a spatial domain, for example. Each domain index may have an associated backoff operation timer that may be incremented when an medium access attempt is unsuccessful. In another example, the first domain index may include a frequency parameter where the medium access is attempted via all of the channels of the medium. If the access attempt is unsuccessful, the second domain index may also include a frequency parameter but with at least one adjusted parameter, e.g., a subset of available channels of the medium. Accordingly, the second medium access attempt may include transmitting signals via the subset of channels indicated in the second domain index. The subset of channels may support a more narrow bandwidth than the full channel list indicated in the first domain index.

The access control component 315 may manage, control, or otherwise perform various functions related to accessing one or more resources of the medium for the apparatus 201-a. The access control component 315 may communicate with the domain index component 310 and receive an indication of a frequency domain, a spatial domain, or a combination frequency/spatial domain to use for accessing the medium. The access control component 315 may communication with the transmitter 215-a to transmit one or more signals to access the medium according to the domain index.

In some aspects, the access control component 315 may monitor, manage, control, or otherwise perform various functions related to performing a power control procedure with an access point prior to accessing the wireless medium. For example, the access control component 315 may communicate with the access point to determine channel conditions for the wireless medium and, based on the channel conditions, determine a transmission power level to establish a receive signal power level at the access point that supports communications without interference. The power control procedure may be repeated as channel conditions change, according to a periodic schedule, etc.

In some aspects, the access control component 315 may manage aspects of transmitting a trigger frame upon accessing the wireless medium but prior to transmitting messages to the AP. For instance, the access control component 315 may communicate with one or more other components of the apparatus 201-a to determine resources of the wireless medium needed for communications. When the needed resources do not require all of the resources of the wireless medium, the access control component 315 may transmit the trigger frame indicating which resources of the medium are reserved for the apparatus 201-a. Other wireless stations may receive the trigger frame and access the wireless medium a SIFS period thereafter.

Figure 4:
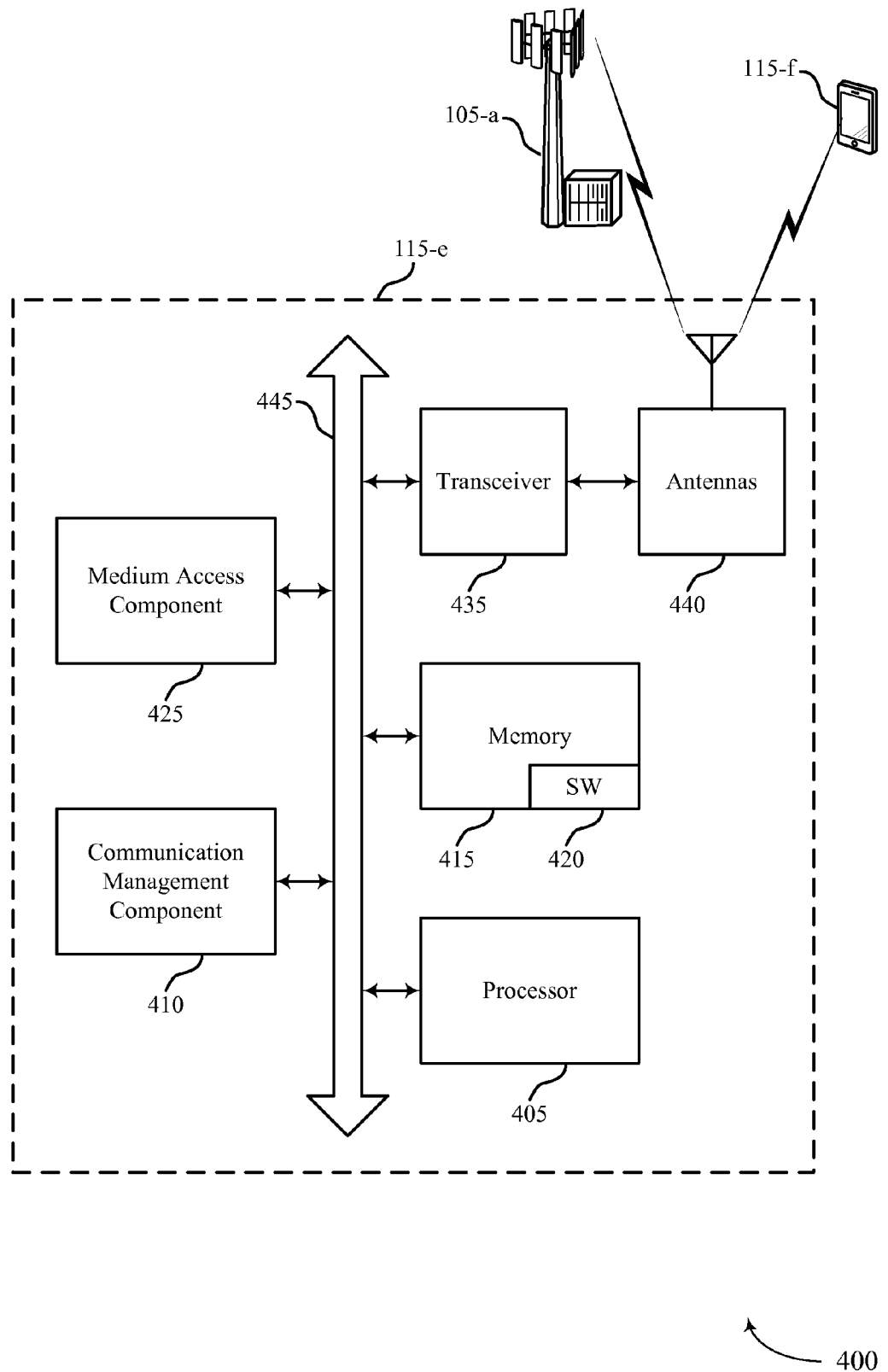
FIG. 4 shows a block diagram of a wireless communication system, in accordance with various aspects of the present disclosure.

Turning to FIG. 4, a diagram 400 is shown that illustrates a wireless station 115-e configured for multi-dimensional content resolution techniques for wireless medium access. The wireless station 115-e may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The wireless station 115-e may have an internal power supply (not shown), such as a small battery, to facilitate mobile operation. The wireless station 115-e may be an example of the wireless stations 115 and/or apparatuses 201 and 201-a of FIGS. 1-3.

The wireless station 115-e may include a processor 405, a memory 415, a transceiver 435, antennas 440, a medium access component 425, and a communications management component 410. The medium access component 425 may be an example of the medium access component 210 of FIG. 2 or 3. Each of these components may be in communication with each other, directly or indirectly, over at least one bus 445.

The memory 415 may include RAM and ROM. The memory 415 may store computer-readable, computer-executable software (SW) code 420 containing instructions that are configured to, when executed, cause the processor 405 to perform various functions described herein for medium access. Alternatively, the software code 420 may not be directly executable by the processor 405 but be configured to cause the computer (e.g., when compiled and executed) to perform functions described herein.

The processor 405 may include an intelligent hardware device, e.g., a CPU, a microcontroller, an ASIC, etc. The processor 405 may process information received through the transceiver 435 and/or to be sent to the transceiver 435 for transmission through the antennas 440. The processor 405 may handle, alone or in connection with the medium access component 425, various aspects for content resolution techniques for accessing a wireless medium using one or more of a spatial domain or a frequency domain.

The transceiver 435 may be configured to communicate bi-directionally with APs 105 in FIG. 1 and/or with other wireless station 115, mobile devices, and/or apparatuses of FIGS. 2-3. The transceiver 435 may be implemented as at least one transmitter component and at least one separate receiver component. The transceiver 435 may include a modem configured to modulate the packets and provide the modulated packets to the antennas 440 for transmission, and to demodulate packets received from the antennas 440. While the wireless station 115-e may include a single antenna, there may be aspects in which the wireless station 115-e may include multiple antennas 440.

According to the architecture of FIG. 4, the wireless station 115-e may further include a communications management component 410. The communications management component 410 may manage communications with various access points 105-a, wireless stations 115-f, etc. The communications management component 410 may be a component of the wireless station 115-e in communication with some or all of the other components of the wireless station 115-e over the at least one bus 445. Alternatively, functionality of the communications management component 410 may be implemented as a component of the transceiver 435, as a computer program product, and/or as at least one controller element of the processor 405.

The components of the wireless station 115-e may be configured to implement aspects discussed above with respect to FIGS. 1-3, and those aspects may not be repeated here for the sake of brevity.

Figure 5:
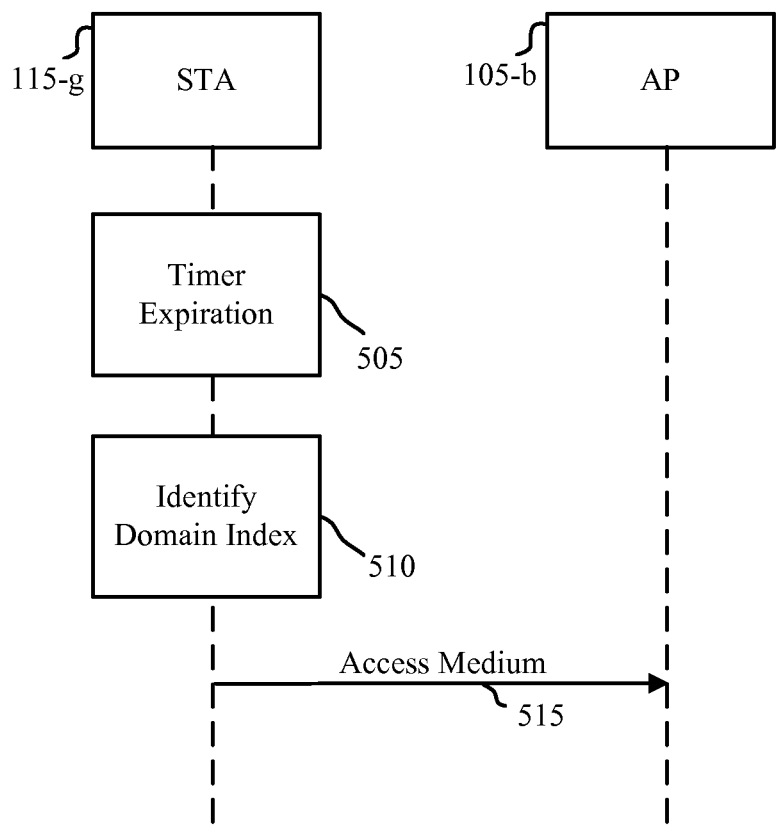
FIG. 5 shows a swim lane diagram illustrating aspects of wireless communication, in accordance with various aspects of the present disclosure.

FIG. 5 is a swim lane diagram 500 illustrating aspects of wireless communication, in accordance with various aspects of the present disclosure. The diagram 500 may illustrate aspects of the WLAN network 100 described with reference to FIG. 1. The diagram 500 includes a wireless station 115-g and an AP 105-b. The wireless station 115-g may be an example of at least one of the wireless stations 115 and/or the apparatuses 201 and 201-a described above with respect to FIGS. 1-4. The AP 105-b may be an example of at least one of the APs 105 described above with respect to FIGS. 1-4. Generally, the diagram 500 illustrates aspects of accessing a medium via one or more domain indexes to avoid collisions. In some examples, a system device, such as one of the wireless stations 115, apparatuses 201 and 201-*a*, and/or APs 105 may execute sets of codes to control the functional elements of the device to perform some or all of the functions described below.

At block 505, the wireless station 115-*g* may determine that a timer associated with backoff operations has expired. The access timer may be initialized based on a determination that the wireless station 115-*g* has information to communicate. The access timer may run for a predetermined period, the timer being decremented while the channel (e.g., subchannel, spatial stream, or combination of both) over which the access is to be performed is idle, and frozen otherwise. Each wireless station associated with the access point may have a different interval access timer. In some examples, the access timer may be a function of a random number and a timing characteristic of the wireless medium, e.g., a frame length, etc. Generally, the expiration of the access timer may indicate that the wireless station 115-*g* is ready to access a wireless medium.

At 510, the wireless station 115-*g* may identify a domain index for accessing the wireless medium. The domain index may include information indicative of a frequency domain, a spatial domain, or a combination of both. The domain index may provide an indication of how the wireless station 115-*g* may access the medium, e.g., which spatial stream to communicate on, which subband(s) to communicate on, etc. At 515 the wireless station 115-*g* may access the wireless medium of the AP 105-*b* according to the identified domain index.

Figure 6:
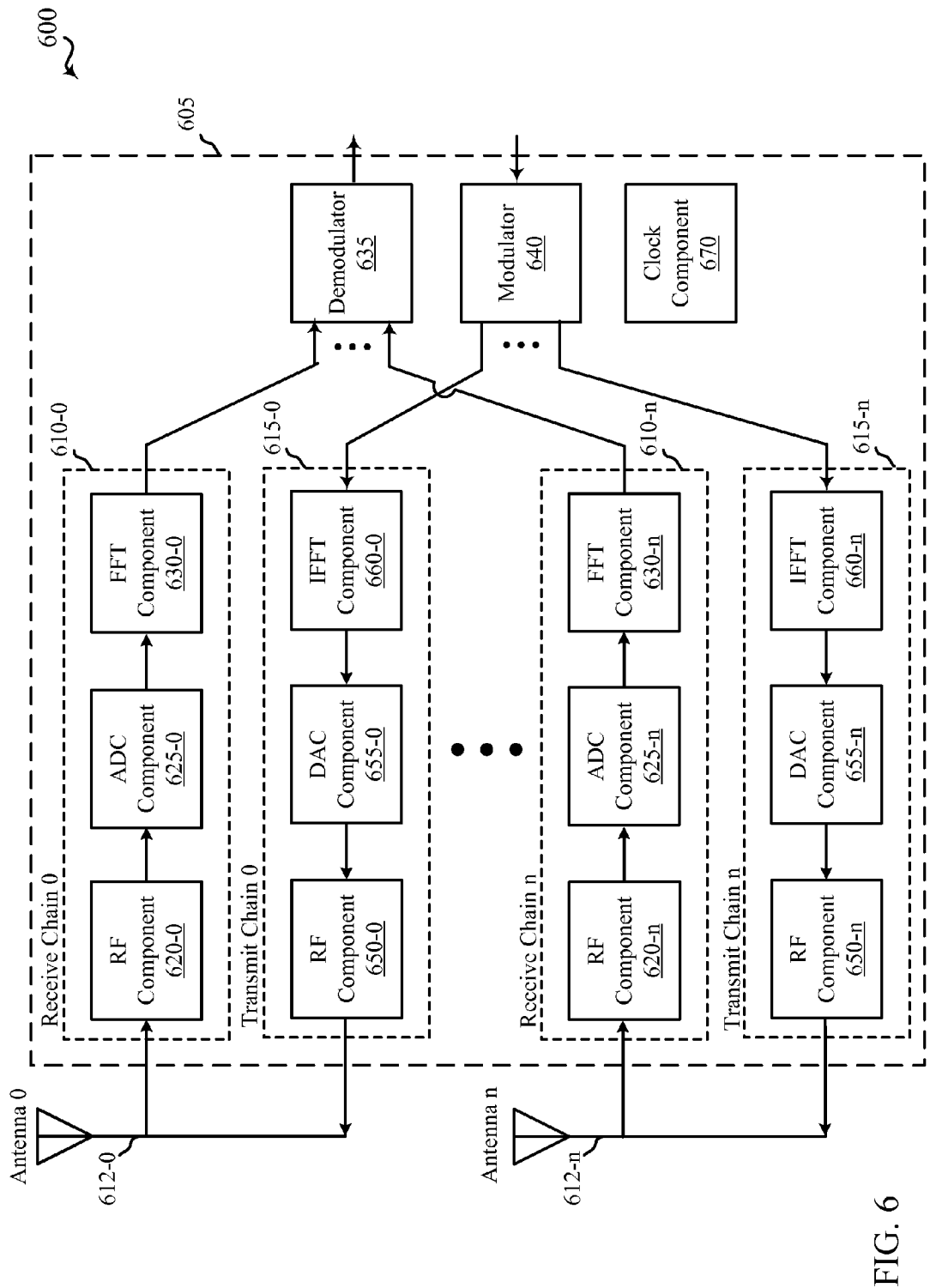
FIG. 6 shows a block diagram of an apparatus for use in wireless communication, in accordance with various aspects of the present disclosure.

FIG. 6 is a block diagram 600 conceptually illustrating a design of transceiver component 605, in accordance with aspects of the present disclosure. The transceiver component 605 may have various other configurations and may be included or be part of a mobile device or device such as wireless stations 115 described with respect to FIGS. 1-5. The transceiver component 605 may be an example of the transceiver component(s) 435 of FIG. 4. The transceiver component 605 may include multiple receive chains 610, including receive chain 0 610-0 through receive chain n 610-*n*, and multiple transmit chains 615, including transmit chain 0 610-0 through transmit chain n 610-*n*. Each of receive chains 610-0-610-*n* and transmit chains 615-0-615-*n* may be coupled with an associated antenna 612, namely antenna 0 612-0 through antenna n 612-*n*, respectively. Receive chains 610-0-610-*n* may, respectively, include RF components 620-0 through 620-*n*, analog-to-digital converter (ADC) components 625-*a* through 625-*n*, and fast Fourier transform (FFT) component 630-0 through 630-*n*, and may be coupled with a demodulator 635. Transmit chains 615-0-615-*n* may include, respectively, RF components 650-0 through 650-*n*, digital-to-analog converter (DAC) components 655-0 through 655-*n*, and inverse FFT (IFFT) components 660-0 through 660-*n*, and may be coupled with a modulator 640.

According to some examples, transceiver component 605 may be configured to support multi-dimensional contention resolution techniques for wireless medium access according to various aspects of the present disclosure. In some aspects, the transceiver component 605 may support MU MIMO or OFDMA for UL communications to an access point. For example, at least one of the transmit chains 615 may be configurable to transmit signals to an access point via an associated antenna 612 where each transmission from an antenna 612 forms a spatial stream between the access point and the transceiver component 605. In some examples, one, two, three, or some other number of transmit chains 615 may be associated with a domain index and used to access a wireless medium via a corresponding number of spatial streams. Each spatial stream may also include an associated receive chain 610.

Figures 7, 8:
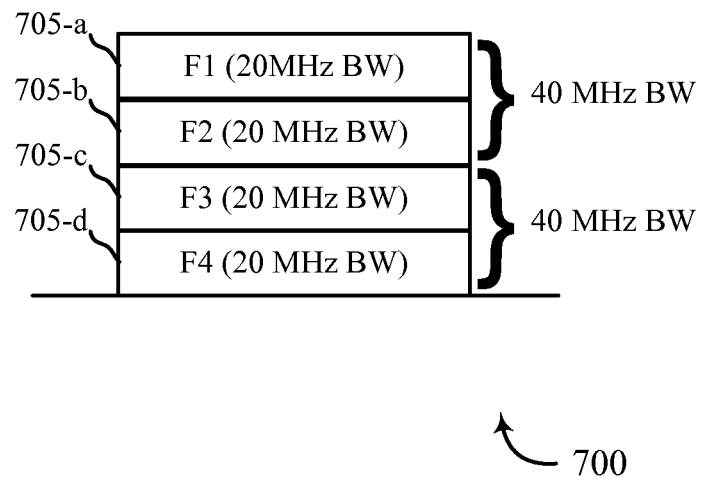
FIG. 7 shows a diagram conceptually illustrating various aspects of a medium for use in wireless communication, in accordance with various aspects of the present disclosure.
FIG. 8 shows a diagram conceptually illustrating various aspects of a medium for use in wireless communication, in accordance with various aspects of the present disclosure.

FIG. 7 is a diagram 700 conceptually illustrating aspects of an example frequency domain for contention resolution in wireless medium access in accordance with various aspects of the present disclosure. The diagram 700 may illustrate aspects of the WLAN network 100 described with reference to FIG. 1. The diagram 700 may be implemented by at least one of the wireless stations 115 and/or access points 105 described above with respect to FIGS. 1-6.

As discussed, a wireless station may identify a domain index that may include information indicative of a frequency domain. The frequency domain may include one or more channels or subchannels 705 of the wireless medium associated with the OFDMA or FDMA transmission mode. Although diagram 700 shows four subchannels 705, it is to be understood that the wireless medium may include more or fewer subchannels 705. Each subchannel 705 may support a predetermined bandwidth, e.g., 2.5 MHz, 5 MHz, 10 MHz, 20 MHz, etc. In the non-limiting example shown in diagram 700, each subchannel 705 may support 20 MHz.

In some aspects, the domain index may include information associated with the wireless station accessing the medium using subchannels 705-*a* through 705-*d*. Accordingly, the wireless station may perform an access procedure associated with one domain index, such as a specific subchannel or spatial stream, during which the access timer is decremented based on the stat of the channel corresponding to the domain index. Upon expiration of the access timer associated with the domain index, send signal(s) to the access point via subchannels 705-*a*, 705-*b*, 705-*c*, and 705-*d*. In some examples, if the medium access attempt is unsuccessful, the wireless station may adjust at least one parameter of the domain index. For example, the wireless station may adjust a subchannel parameter and/or a subchannel parameter for the domain index and attempt to access the medium according to the adjusted parameter. As one example, the wireless station may reduce the subchannels 705 associated with the domain index and attempt to access the medium via subchannels 705-*a* and 705-*b*. Accordingly, the wireless station may access the medium with a reduced bandwidth of 40 MHz.

In another embodiment, the wireless station may perform an access procedure associated with one domain index or a set of domain indexes, i.e., timer is decremented based on the state of the channel corresponding to one or more domain indexes. upon expiration of the access timer the wireless station may transmit on a subset of the domain indexes. For example, a wireless station may perform the access procedure by measuring the energy present on one or more subchannels. Upon expiration of the access timer the STA may transmit only on the idle subchannels and on a subset of the allocable spatial streams.

In another non-limiting example, the wireless station may identify a domain index including a frequency domain where the wireless station attempts to access the medium via subchannel 705-*a*. If the access attempt is unsuccessful, the wireless station may adjust the subchannel parameter and attempt to access the medium via subchannel 705-*b*.

In some aspects, the described access attempts via the adjusted domain index may be delayed according to an associated timer.

FIG. 8 is a diagram 800 conceptually illustrating aspects of an example multi-dimensional aspects for contention resolution in wireless medium access in accordance with various aspects of the present disclosure. The diagram 800 may illustrate aspects of the WLAN network 100 described with reference to FIG. 1. The diagram 800 may be implemented by at least one of the wireless stations 115 and/or access points 105 described above with respect to FIGS. 1-6.

As discussed, a wireless station may identify a domain index associated with medium access for contention resolution procedures. In the example shown in diagram 800, the domain index may include information indicative of resources for domain access. The resources may be associated for a particular time and subchannel, or a plurality of time and subchannels, or a particular time and spatial stream, or a plurality of time and streams. Generally, the wireless station may identify a domain index associated with the resources in multiple dimensions and, in some aspects, include an ordering of the resources. Accordingly, the wireless station may perform access operations according to the ordered resources. In some aspects, an access timer may be used and may be decremented as a function of the idle/busy state of the resources. If one of the resources becomes busy, the access timer may continue on the next resource according to the order.

In the example shown in diagram 800, a domain index may include ordered resources that may include a plurality of time-subchannel blocks 805. The wireless station may initiate an access timer and monitor the status of the resource according to the order, or in reverse order (as shown in diagram 800). The wireless station may monitor resource 9, then resource 8, then resource 7, and so on until a free resource is identified. The wireless station (e.g., STA1) may transmit one or more signals to access the medium according to the available resource (identified as STA1 PAD in diagram 800). Additionally, a second wireless station (STA2) may perform contention resolution procedures to access the medium according to its assigned resource (shown as STA2 PAD in diagram 800). If both wireless stations are able to access the wireless mediums, they may enter a data transmission period 810 and send one or more protocol data units.

Figure 9:
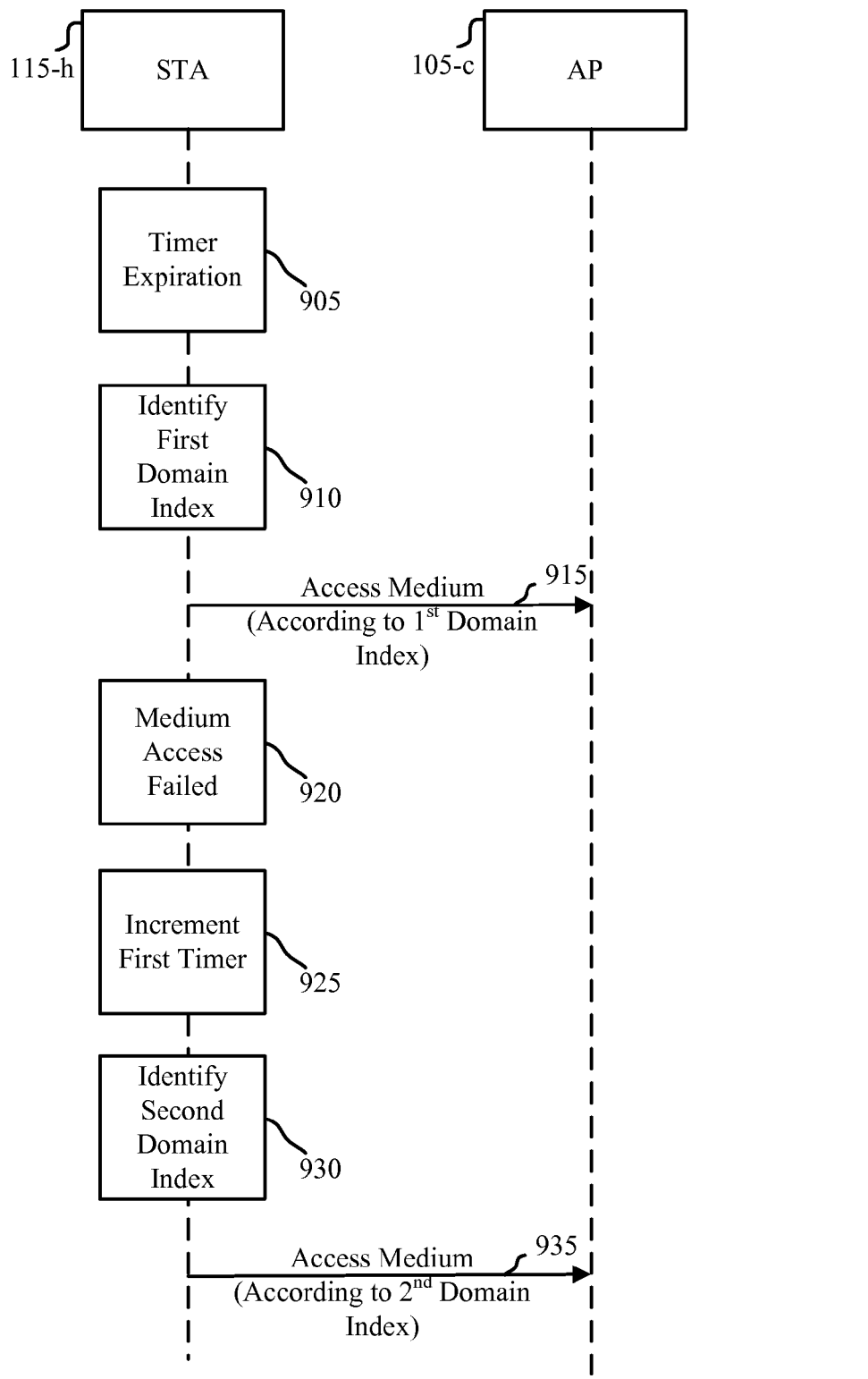
FIG. 9 shows a swim lane diagram illustrating aspects of wireless communication, in accordance with various aspects of the present disclosure.

FIG. 9 is a swim lane diagram 900 illustrating aspects of wireless communication, in accordance with various aspects of the present disclosure. The diagram 900 may illustrate aspects of the WLAN network 100 described with reference to FIG. 1. The diagram 900 includes a wireless station **115-*h* and an access point 105-*c*. The wireless station 115-*h* may be an example of at least one of the wireless stations 115 and/or the apparatuses 201 and 201-*a* described above with respect to FIGS. 1-4. The access point 105-*c* may be an example of at least one of the access points 105 described above with respect to FIGS. 1-4. Generally, the diagram 900 illustrates aspects of accessing a medium via one or more domain indexes to avoid collisions. In some examples, a system device, such as one of the wireless stations 115, apparatuses 201 and 201-*a*, and/or APs 105** may execute sets of codes to control the functional elements of the device to perform some or all of the functions described below.

At block 905, the wireless station **115-*g* may determine that a timer associated with backoff operations has expired. The timer may be associated with a domain index for the medium access and may be initialized based on a determination that the wireless station 115-*h* has information to communicate and that the wireless medium of the access point 105-*c* is busy. Generally, the expiration of the access timer may indicate that the wireless station 115-*h* is ready to access a wireless medium of the access point At 910, the wireless station 115-*h* may identify a first domain index for accessing the wireless medium. The first domain index may include information indicative of a frequency domain, a spatial domain, or a combination of both. The domain index may provide an indication of how the wireless station 115-*h* may access the medium, e.g., which spatial stream to communicate on, which subband(s) to communicate on, which time-subchannel resource to communicate on, which time-spatial stream resource to communicate on, etc. At 915 the wireless station 115-*h* may access the wireless medium of the AP 105-*c*** according to the identified first domain index.

At 920, the wireless station **115-*h* may determine that the attempt to access the medium according to the first domain index has failed or is unsuccessful. For instance, the attempt may be unsuccessful if another wireless station attempts to access the wireless medium using the same domain index, or at least a portion of the resources associated with the domain index. At 925, the wireless station 115-*h* may increment the access timer. At 930, the wireless station 115-*h* may identify a second domain index. That is, the wireless station may identify information associated with a set of domain indexes and, therefore, cycle through at least a portion of the domain indexes for medium access attempts. At 930, the wireless station 115-*h*** may access the wireless medium according to the second domain index. In some examples, the second domain index may be associated with different subchannels, different spatial streams, different resources, or combinations thereof, with respect to the first domain index.

Figure 10:
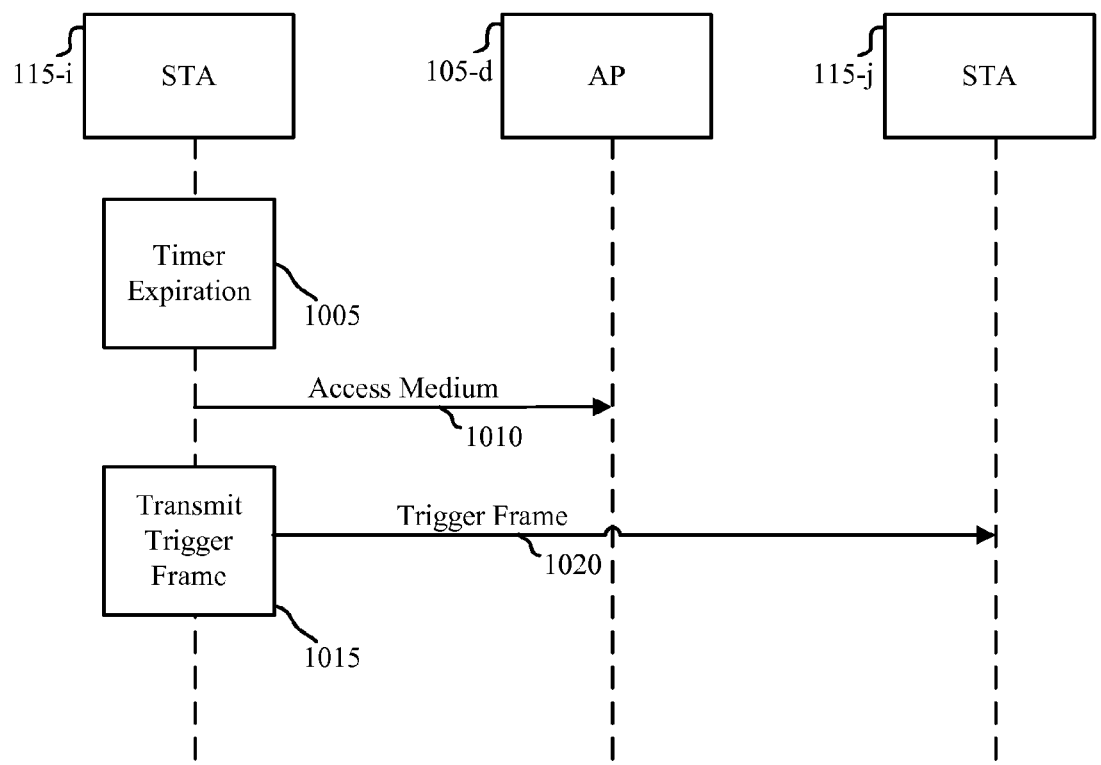
FIG. 10 is a flow chart illustrating an example of a method for wireless communication, in accordance with various aspects of the present disclosure.

FIG. 10 is a swim lane diagram 1000 illustrating aspects of wireless communication, in accordance with various aspects of the present disclosure. The diagram 1000 may illustrate aspects of the WLAN network 100 described with reference to FIG. 1. The diagram 1000 includes a wireless station **115-*i*, an access point 105-*d*, and a wireless station 115-*j*. The wireless station 115-*h* and/or 115-*j* may be an example of at least one of the wireless stations 115 and/or the apparatuses 201 and 201-*a* described above with respect to FIGS. 1-4. The access point 105-*d* may be an example of at least one of the access points 105 described above with respect to FIGS. 1-4. Generally, the diagram 1000 illustrates aspects of a wireless station transmitting a trigger frame. In some examples, a system device, such as one of the wireless stations 115, apparatuses 201 and 201-*a*, and/or APs 105** may execute sets of codes to control the functional elements of the device to perform some or all of the functions described below.

At block 1005, the wireless station **115-*i* may determine that a timer associated with backoff operations has expired. Generally, the expiration of the access timer may indicate that the wireless station 115-*i* is ready to access a wireless medium. At 1010, the wireless station 115-*i* may access the wireless medium of the AP 105-*d*. The wireless station 115-*i* may access the medium using current EDCA techniques or via any of the presently described multi-dimensional contention resolution techniques. That is, the wireless station 115-*i*** may determine and transmit the trigger frame irrespective of the medium access contention resolution method.

At 1015, the wireless station **115-*i* may transmit a trigger frame to the wireless station 115-*j* at 1020. Generally, the trigger frame may include an indication of what resources of the medium the wireless station 115-*i* is using (e.g., reserved resources) and, therefore, which resources of the wireless medium are available for use by other wireless stations. The trigger frame may include an indication identifying the wireless station 115-*j*. As such, the wireless station 115-*j* may access the unused resources of the wireless medium and share the medium with the wireless station 115-*i***.

Figure 11:
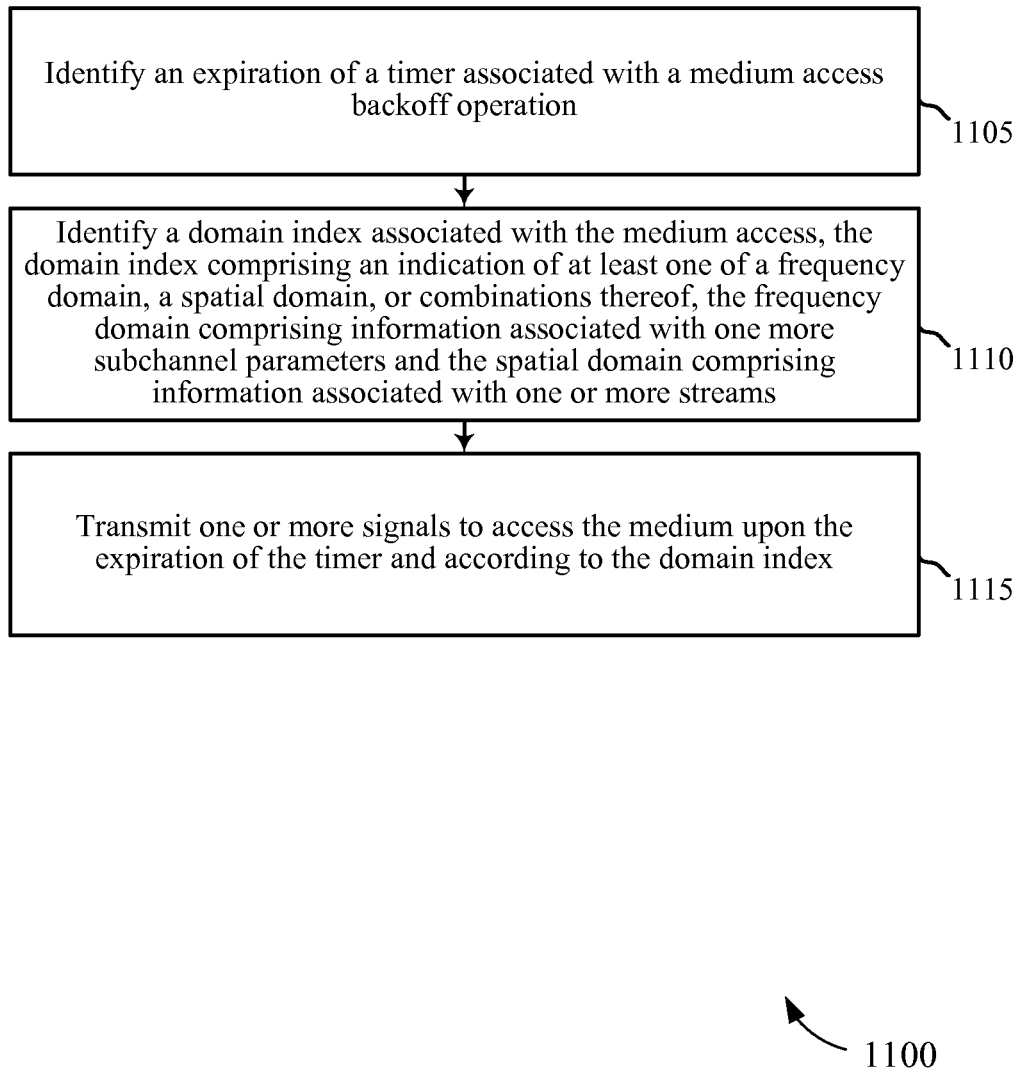
FIG. 11 is a flow chart illustrating an example of a method for wireless communication, in accordance with various aspects of the present disclosure.

FIG. 11 is a flow chart illustrating an example of a method 1100 for wireless communication, in accordance with various aspects of the present disclosure. For clarity, the method 1100 is described below with reference to aspects of one or more of the wireless stations described with reference to FIG. 1, and/or aspects of one or more of the wireless stations, devices, and/or apparatuses described with reference to FIGS. 2-10. In some examples, a wireless station may execute one or more sets of codes to control the functional elements of the wireless station to perform the functions described below. Additionally or alternatively, the wireless station may perform one or more of the functions described below using special-purpose hardware.

At block 1105, the method 1100 may include identifying an expiration of a timer associated with a medium access backoff operation. The timer may provide a timer period where a wireless station defers its attempt to access the wireless medium. At block 1110, the method 1100 may include identifying a domain index associated with the medium access. The domain index may include an indication of a frequency domain, a spatial domain, or a combination thereof. The domain index may provide for a mechanism for the wireless station to access the wireless medium that uses multiple dimensions to avoid collisions with other wireless stations attempting to access the medium. The frequency domain may include information associated with one more subchannel parameters and the spatial domain may include information associated with one or more streams.

At block 1115, the method 1100 may include transmitting one or more signals to access the medium upon the expiration of the timer and according to the domain index. For example, the wireless station may transmit signals on subchannels identified in a frequency domain and/or on a spatial stream identified in a spatial domain. In another example, the wireless device may transmit signals on a time-subchannel resource and/or on a time-spatial stream resource of the wireless medium.

The operation(s) at block 1105, 1110, and/or 1115 may be performed using the medium access component 210 described with reference to FIGS. 2-4.

Thus, the method 1100 may provide for wireless communication. It should be noted that the method 1100 is just one implementation and that the operations of the method 1100 may be rearranged or otherwise modified such that other implementations are possible.

Figure 12:
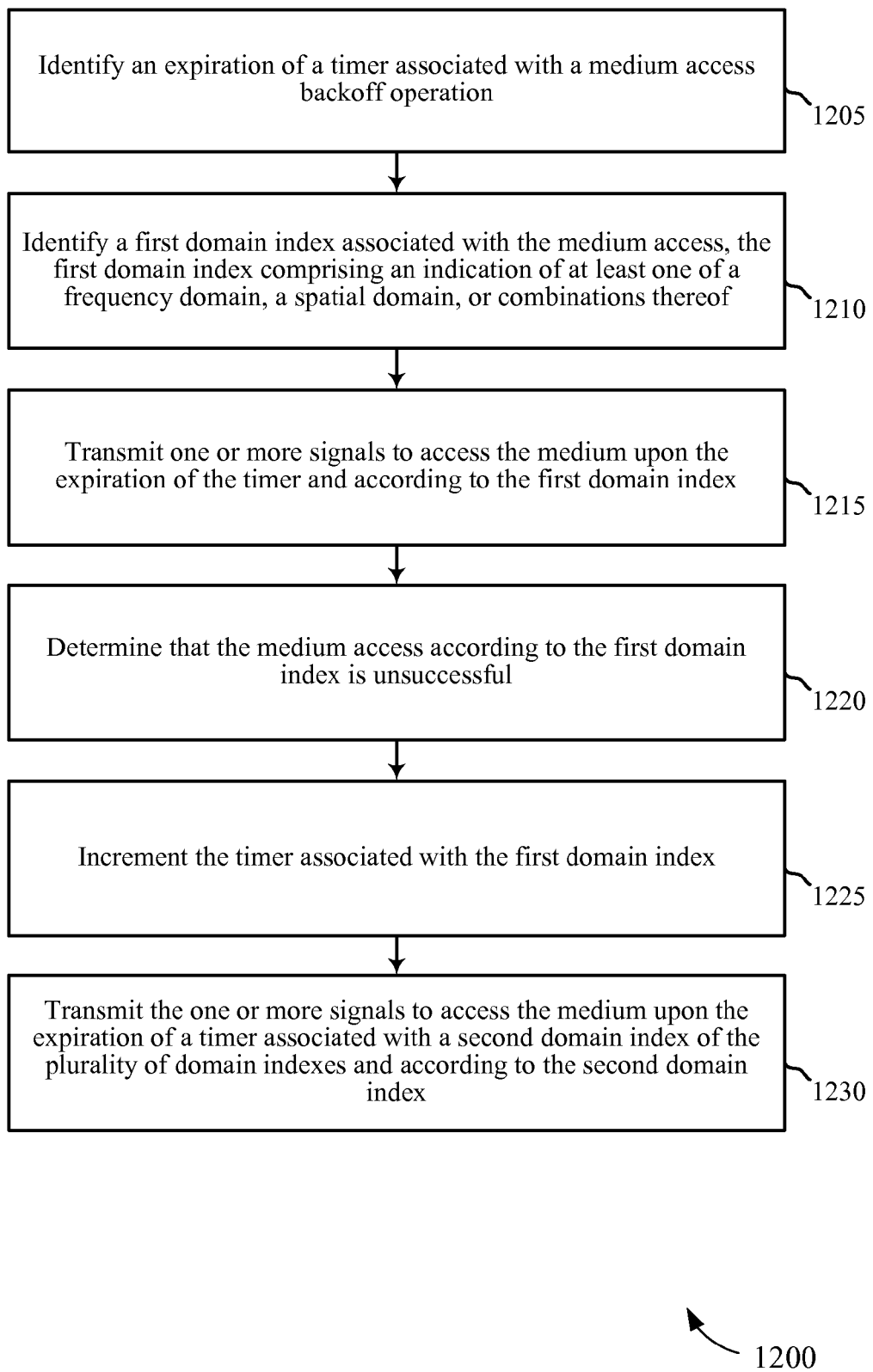
FIG. 12 is a flow chart illustrating an example of a method for wireless communication, in accordance with various aspects of the present disclosure.

FIG. 12 is a flow chart illustrating an example of a method 1200 for wireless communication, in accordance with various aspects of the present disclosure. For clarity, the method 1200 is described below with reference to aspects of one or more of the wireless stations described with reference to FIG. 1, and/or aspects of one or more of the wireless stations, devices, and/or apparatuses described with reference to FIGS. 2-10. In some examples, a wireless station may execute one or more sets of codes to control the functional elements of the wireless station to perform the functions described below. Additionally or alternatively, the wireless station may perform one or more of the functions described below using special-purpose hardware.

At block 1205, the method 1200 may include identifying an expiration of a timer associated with a medium access backoff operation. The timer may provide a timer period where a wireless station defers its attempt to access the wireless medium. At block 1210, the method 1200 may include identifying a first domain index associated with the medium access. The first domain index may include an indication of a frequency domain, a spatial domain, or a combination thereof. At block 1215, the method 1200 may include transmitting one or more signals to access the medium upon the expiration of the timer and according to the first domain index. For example, the wireless station may transmit signals on subchannels identified in a frequency domain and/or on a spatial stream identified in a spatial domain. In another example, the wireless device may transmit signals on a time-subchannel resource and/or on a time-spatial stream resource of the wireless medium.

At block 1220, the method 1200 may include determining that the medium access attempt according to the first domain index is unsuccessful, e.g., that the transmitted signals collided with signals from another wireless station. Accordingly, at block 1225 the method 1200 may include incrementing the time associated with the first domain index. Accordingly, an access attempt for the medium according to the first domain index may be deferred. At block 1230, the method 1200 may include transmitting one or more signals to access the medium upon the expiration of a timer associated with a second domain index and according to the second domain index. For example, a wireless station may identify a second domain index to use for medium access and, when the first domain index access attempt fails, cycle to the second domain index to attempt medium access.

The operation(s) at block 1205, 1210, 1215, 1220, 1225, 1230 and/or 1235 may be performed using the medium access component 210 described with reference to FIGS. 2-4.

Thus, the method 1200 may provide for wireless communication. It should be noted that the method 1200 is just one implementation and that the operations of the method 1200 may be rearranged or otherwise modified such that other implementations are possible.

Figure 13:
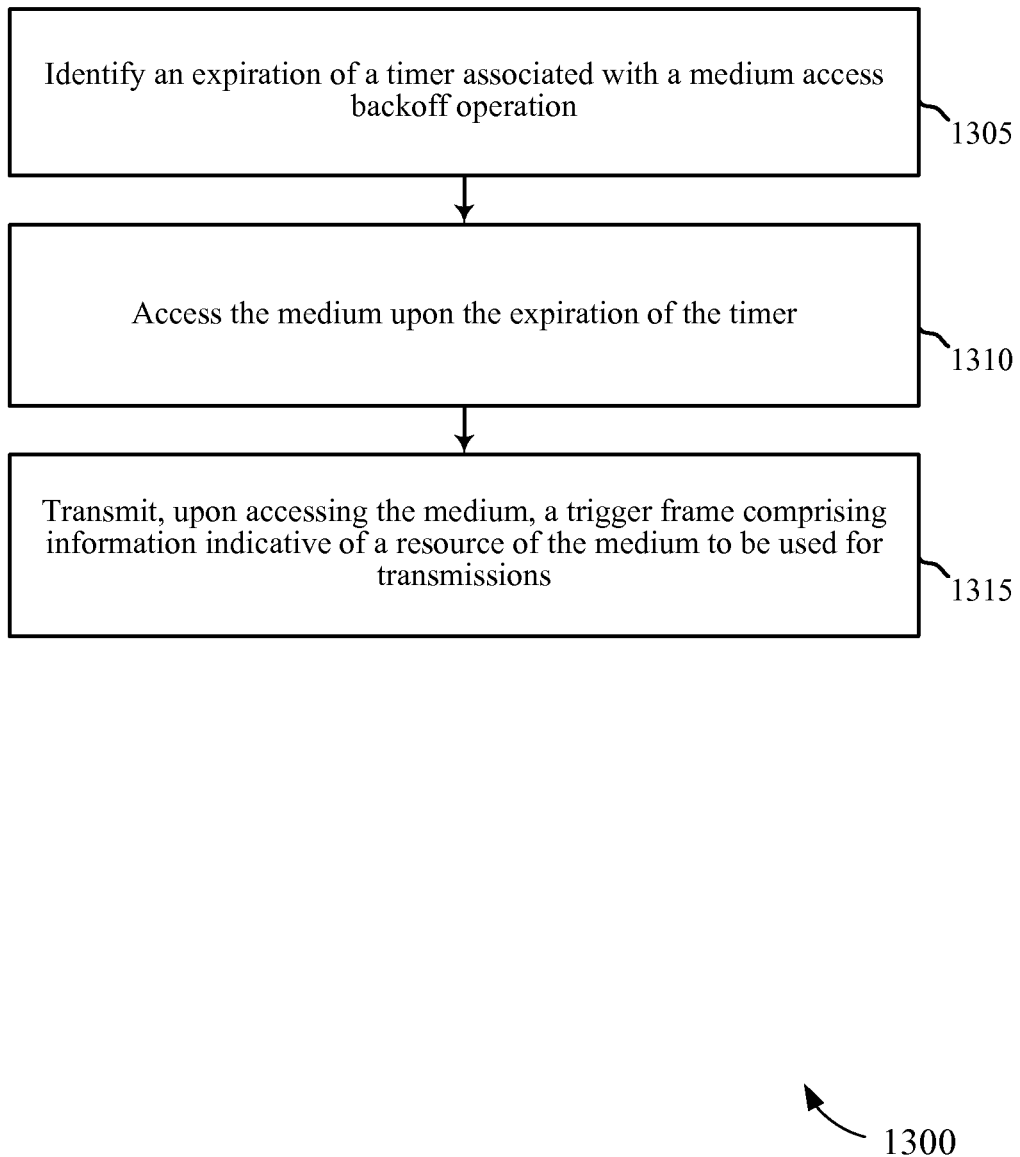
FIG. 13 is a flow chart illustrating an example of a method for wireless communication, in accordance with various aspects of the present disclosure.

FIG. 13 is a flow chart illustrating an example of a method 1300 for wireless communication, in accordance with various aspects of the present disclosure. For clarity, the method 1300 is described below with reference to aspects of one or more of the wireless stations described with reference to FIG. 1, and/or aspects of one or more of the wireless stations, devices, and/or apparatuses described with reference to FIGS. 2-10. In some examples, a wireless station may execute one or more sets of codes to control the functional elements of the wireless station to perform the functions described below. Additionally or alternatively, the wireless station may perform one or more of the functions described below using special-purpose hardware.

At block 1305, the method 1300 may include identifying an expiration of a timer associated with a medium access backoff operation. The timer may provide a timer period where a wireless station defers its attempt to access the wireless medium. At block 1310, the method 1300 may include accessing the medium upon the expiration of the timer. The medium access may be performed using the presently described multi-dimensional contention resolution techniques or via traditional EDCA techniques.

At block 1315, the method 1300 may include transmitting, upon accessing the medium, a trigger frame that includes information indicative of resources of the medium to be used for transmissions. The resources may be a frequency domain resource, a spatial domain resource, a time-subchannel resource, a time-spatial stream resource, or combinations or multiples thereof. The trigger frame may be received by other wireless stations that can access the medium to utilize the free resources of the medium.

The operation(s) at block 1305, 1310, and/or 1315 may be performed using the medium access component 210 described with reference to FIGS. 2-4.

Thus, the method 1300 may provide for wireless communication. It should be noted that the method 1300 is just one implementation and that the operations of the method 1300 may be rearranged or otherwise modified such that other implementations are possible.

In some examples, aspects from two or more of the methods 1100-1300 may be combined. It should be noted that the methods 1100, 1200, 1300, etc. are just example implementations, and that the operations of the methods 1100-1300 may be rearranged or otherwise modified such that other implementations are possible.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for Wi-Fi communication, comprising:
   identifying an expiration of a timer associated with a medium access backoff operation;
   identifying a domain index associated with the medium access, the domain index comprising information indicative of a primary channel of a basic subscriber set and an indication of one of a frequency domain, a spatial domain, or combinations thereof, wherein the frequency domain comprises information associated with one more subchannel parameters and the spatial domain comprises information associated with one or more streams;
   transmitting one or more signals to access the medium upon the expiration of the timer and according to the domain index, wherein accessing the medium comprises accessing a subset of available resources of the medium; and
   transmitting, upon accessing the medium, a trigger frame comprising information indicative of one or more resources of the medium to be used for transmission.

2. The method of claim 1, further comprising:
   performing, prior to accessing the medium, a timing synchronization alignment with an access point associated with the medium.

3. The method of claim 1, further comprising:
performing, prior to accessing the medium, a power control procedure with an access point associated with the medium.

4. The method of claim 1, further comprising:
selecting the domain index from a set of available domain indexes.

5. The method of claim 1, further comprising:
receiving a signal from an access point associated with the medium, the signal comprising an indication of the domain index.

6. The method of claim 1, further comprising:
identifying a plurality of domain indexes associated with the medium access;
identifying an expiration of a timer associated with at least one of the plurality of domain indexes for the medium access; and
transmitting the one or more signals to access the medium upon the expiration of the timer associated with a first domain index of the plurality of domain indexes and according to the first domain index.

7. The method of claim 6, further comprising:
determining that the medium access according to the first domain index is unsuccessful;
incrementing the timer associated with the first domain index; and
transmitting the one or more signals to access the medium upon the expiration of a timer associated with a second domain index of the plurality of domain indexes and according to the second domain index.

8. The method of claim 1, further comprising:
sharing at least a portion of the one or more resources of the medium based on transmission of the trigger frame.

9. The method of claim 8, wherein the at least portion of the one or more resources of the medium are shared with a wireless station.

10. The method of claim 1, further comprising:
determining that the medium access according to the domain index associated with the frequency domain is unsuccessful;
adjusting the one or more subchannel parameters; and
transmitting the one or more signals to access the medium upon the expiration of the timer and according to the frequency domain comprising the adjusted one or more subchannel parameters.

11. The method of claim 10, wherein adjusting the one or more subchannel parameters comprises reducing a bandwidth parameter for the medium access.

12. An apparatus for Wi-Fi communication, comprising:
a processor;
memory in electronic communication with the processor; and
instructions being stored in the memory, the instructions being executable by the processor to:
identify an expiration of a timer associated with a medium access backoff operation;
identify a domain index associated with the medium access, the domain index comprising information indicative of a primary channel of a basic subscriber set and an indication of one of a frequency domain, a spatial domain, or combinations thereof, wherein the frequency domain comprises information associated with one more subchannel parameters and the spatial domain comprises information associated with one or more streams;
transmit one or more signals to access the medium upon the expiration of the timer and according to the domain index, wherein accessing the medium comprises accessing a subset of available resources of the medium; and
transmit, upon accessing the medium, a trigger frame comprising information indicative of one or more resources of the medium to be used for transmission.

13. The apparatus of claim 12, further comprising instructions executable by the processor to:
perform, prior to accessing the medium, a timing synchronization alignment with an access point associated with the medium.

14. The apparatus of claim 12, further comprising instructions executable by the processor to:
perform, prior to accessing the medium, a power control procedure with an access point associated with the medium.

15. A method for Wi-Fi communication, comprising:
identifying an expiration of a timer associated with a medium access backoff operation;
identifying a domain index indicative of a primary channel of a basic subscriber set;
accessing the medium upon the expiration of the timer and according to the domain index, wherein accessing the medium comprises accessing a subset of available resources of the medium; and
transmitting, upon accessing the medium, a trigger frame comprising information indicative of resources of the medium to be used for transmissions.

16. The method of claim 15, further comprising:
sharing at least a portion of the one or more resources of the medium based on transmission of the trigger frame.

17. The method of claim 15, wherein the one or more resources comprises a frequency resource, a channel resource, a bandwidth resource, a time resource, or combinations thereof.

18. The method of claim 15, wherein the trigger frame is transmitted prior to other transmissions.

* * * * *